US012577397B2

(12) United States Patent
Andersen et al.

(10) Patent No.: US 12,577,397 B2
(45) Date of Patent: Mar. 17, 2026

(54) FLAME-RESISTANT GARMENTS AND FABRICS WITH YARNS COMPRISING A POLYMER BLEND OF META-ARAMID AND POLYVINYLPYRROLIDONE

(71) Applicant: DUPONT SAFETY & CONSTRUCTION, INC., Wilmington, DE (US)

(72) Inventors: Mark William Andersen, Charlottesville, VA (US); Mark T Aronson, Midlothian, VA (US); B. Lynne Wiseman, Richmond, VA (US); Reiyao Zhu, Moseley, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 531 days.

(21) Appl. No.: 18/100,332

(22) Filed: Jan. 23, 2023

(65) Prior Publication Data

US 2023/0235173 A1      Jul. 27, 2023

Related U.S. Application Data

(60) Provisional application No. 63/303,715, filed on Jan. 27, 2022.

(51) Int. Cl.
C08L 77/06 (2006.01)
(52) U.S. Cl.
CPC .................................... C08L 77/06 (2013.01)
(58) Field of Classification Search
None
See application file for complete search history.

(56) References Cited

U.S. PATENT DOCUMENTS

| | | | |
|---|---|---|---|
| 3,063,966 A | 11/1962 | Kwolek et al. |
| 3,094,511 A | 6/1963 | Hill, Jr. et al. |
| 3,354,127 A | 11/1967 | Hill, Jr. et al. |
| 3,414,645 A | 12/1968 | Morgan, Jr. |
| 3,767,756 A | 10/1973 | Blades |
| 3,803,423 A | 4/1974 | Libby |

(Continued)

FOREIGN PATENT DOCUMENTS

| | | |
|---|---|---|
| EP | 0381172 A2 | 9/1990 |
| KR | 101415046 B1 | 7/2014 |
| WO | 2018/174106 A1 | 9/2018 |

OTHER PUBLICATIONS

PCT International Search Report for Application No. PCT/US2023/060972; Thomas Humbert, Authorized Officer; ISA/EPO; Apr. 14, 2023.

*Primary Examiner* — Jeffrey D Washville

(57) ABSTRACT

A flame-resistant garment comprising a flame-resistant fabric, and the flame resistant fabric, each comprising a yarn comprising a) 85 to 97 weight percent of a meta-aramid fiber component, and b) 3 to 15 weight percent of a fiber made from para-aramid polymer, based on the total amount of a) and b) in the yarn; wherein the meta-aramid fiber component is:
  i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and
  ii) 0 to 50 weight percent fiber made solely from meta-aramid polymer, based on the total amount of i) and ii) in the meta-aramid fiber component.

23 Claims, 2 Drawing Sheets

(56) References Cited

U.S. PATENT DOCUMENTS

| | | | |
|---|---|---|---|
| 3,803,453 | A | 4/1974 | Hull |
| 3,819,587 | A | 6/1974 | Kwolek |
| 3,869,429 | A | 3/1975 | Blades |
| 3,869,430 | A | 3/1975 | Blades |
| 4,668,234 | A | 5/1987 | Vance et al. |
| 4,755,335 | A | 7/1988 | Ghorashi |
| 4,883,496 | A | 11/1989 | Ghorashi |
| 5,073,440 | A | 12/1991 | Lee |
| 5,096,459 | A | 3/1992 | Ghorashi |
| 5,189,104 | A | 2/1993 | Haubs et al. |
| 5,399,431 | A | 3/1995 | Miess et al. |
| 5,416,164 | A | 5/1995 | Lee |
| 5,523,034 | A | 6/1996 | Lee |
| 5,667,743 | A | 9/1997 | Tai et al. |
| 5,922,830 | A | 7/1999 | Kinoshita et al. |
| 6,303,221 | B1 | 10/2001 | Prior et al. |
| 6,951,896 | B2 | 10/2005 | Ottenheijm |
| 7,393,483 | B2 | 7/2008 | Uda |
| 7,744,999 | B2 | 6/2010 | Zhu |
| 7,771,636 | B2 | 8/2010 | Headinger et al. |
| 7,771,637 | B2 | 8/2010 | Headinger et al. |
| 7,771,638 | B2 | 8/2010 | Headinger et al. |
| 7,780,889 | B2 | 8/2010 | Headinger et al. |
| 7,998,575 | B2 | 8/2011 | Headinger et al. |
| 8,069,642 | B2 | 12/2011 | Zhu |
| 8,133,584 | B2 | 3/2012 | Zhu |
| 2006/0113700 | A1 | 6/2006 | Hartzler et al. |
| 2011/0077347 | A1 | 3/2011 | Reinartz |
| 2013/0055491 | A1 | 3/2013 | Zhu |
| 2017/0204258 | A1 | 7/2017 | Teasley et al. |

HTP flame shrinkage

Comparison Example A

Example 1

Flame shrinkage (warp %)

Exposure time (sec.)

*Fig. 3*

FLAME-RESISTANT GARMENTS AND FABRICS WITH YARNS COMPRISING A POLYMER BLEND OF META-ARAMID AND POLYVINYLPYRROLIDONE

BACKGROUND OF THE INVENTION

Field of the Invention. This invention relates to flame-resistant garments having surprisingly improved predicted protective performance when exposed to a flame such as in a flash fire. This invention also relates to flame-resistant fabrics having a surprisingly reduction in dimensional shrinkage in flame that can be used in such garments. The improved protective performance is surprising, in part, because it is achieved by replacing a fiber made solely with meta-aramid polymer with a fiber made from a blend of meta-aramid polymer and polyvinylpyrrolidone (PVP) polymer. While fiber made solely with meta-aramid polymer is known to be fire-resistant, the additive PVP polymer is not considered a fire-resistant polymer.

Description of Related Art U.S. Pat. Nos. 7,744,999; 8,069,642; and 8,133,584; all to Zhu, disclose fiber compositions having improved flash fire protection such that a wearer would experience less than a 65 percent predicted body burn when exposed to a flash fire exposure of 4 seconds per ASTM F1930. Further, the minimum performance required for flash fire protective apparel, per the NFPA 2112 standard, is less than 50% body burn from a 3 second flame exposure. Since flash fire is a very real threat to workers in some industries, and it is not possible to fully anticipate how long the individual will be engulfed in flames, any improvement in the flash fire performance of protective apparel fabrics and garments has the potential to save lives. Flash fires represent one of the most extreme types of thermal threat a worker can experience; such threats are much more severe than the simple exposure to a flame. Therefore, firefighters, industrial workers, and others who may be exposed to fire and flames need protective clothing and articles made from flame-resistant and thermally-resistant fabrics, and any increase in the effectiveness of these protective articles is welcomed.

BRIEF SUMMARY OF THE INVENTION

This invention relates to a flame-resistant garment comprising a flame-resistant fabric comprising a yarn, the yarn comprising:

a) 85 to 97 weight percent of a meta-aramid fiber component, and b) 3 to 15 weight percent of a fiber made from para-aramid polymer, based on the total amount of a) and b) in the yarn;

wherein the meta-aramid fiber component is:

i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and ii) 0 to 50 weight percent fiber made solely from meta-aramid polymer, based on the total amount of i) and ii) in the meta-aramid fiber component.

This invention also relates to a flame-resistant fabric comprising a yarn, the yarn comprising:

a) 85 to 97 weight percent of a meta-aramid fiber component, and b) 3 to 15 weight percent of a fiber made from para-aramid polymer, based on the total amount of a) and b) in the yarn;

wherein the meta-aramid fiber component is i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and ii) 0 to 50 weight percent fiber made solely from meta-aramid polymer, based on the total amount of i) and ii) in the meta-aramid fiber component.

BRIEF DESCRIPTION OF THE DRAWINGS

FIG. 3 is a graph of the measured flame shrinkage percentage for a flame exposure of 3, 4, and 5 seconds exposure on woven fabrics wherein 100% of the meta-aramid fiber component in the fabric are fibers made solely with meta-aramid polymer, specifically poly (metaphenylene isophthalamide), that does not additionally contain polyvinylpyrrolidone (PVP) as compared with woven fabrics wherein 100% of the meta-aramid fiber component in the fabric are fibers are made from a blend of meta-aramid polymer, specifically poly (metaphenylene isophthalamide), and PVP polymer. Included in the graph is a dotted line illustrating the expected performance of woven fabrics made from a blend of these two fibers; that is, woven fabrics wherein 50% of the meta-aramid fiber component in the fabric are fibers made solely with meta-aramid polymer that do not additionally contain polyvinylpyrrolidone (PVP), and 50% of the meta-aramid fiber component in the fabric are fibers made from a blend of meta-aramid polymer and PVP polymer.

DETAILED DESCRIPTION OF THE INVENTION

Figure 1:
FIG. 1 is a photo of inventive and control garments, respectively, showing the flame damage after a four-second exposure to flames using a thermal manikin testing device, the light areas of the garments being the flame-damaged areas.

This invention relates to a flame-resistant garment comprising a flame-resistant fabric comprising a yarn, the yarn comprising a) 85 to 97 weight percent of a meta-aramid fiber component and b) 3 to 15 weight percent of a fiber made from para-aramid polymer, based on the total amount of a) and b) in the yarn. The meta-aramid fiber component is i) 50 to 100 weight percent fiber made from a polymer blend of meta-aramid polymer and polyvinylpyrrolidone (PVP) polymer and ii) 0 to 50 weight percent fiber made solely from meta-aramid polymer, based on the total amount of i) and ii) in the meta-aramid fiber component. Specifically, the polymer blend comprises 88 to 95 weight percent meta-aramid polymer and 5 to 12 weight percent PVP polymer.

It has been found that fire-resistant garments made from meta-aramid fiber containing a polymer blend of meta-aramid polymer and polyvinylpyrrolidone (PVP) polymer, as described herein, provide surprisingly increased predicted total body burn protection in a flame event when compared to garments made from meta-aramid fiber that does not contain the meta-aramid polymer/PVP polymer blend and is otherwise known herein as fiber made solely from meta-aramid polymer. Specifically, the phrase "fiber made solely from meta-aramid polymer" means the fiber comprises meta-aramid polymer but does not contain a polymer blend of meta-aramid polymer and PVP polymer; the fiber can contain other non-polymer components such as additives, pigments, and the like, and can contain other blended polymers as long as the flame retardant properties of the meta-aramid polymer are not compromised. Preferably the only polymer component in the fiber made solely from meta-aramid polymer is meta-aramid polymer, and most preferably the only polymer component in the fiber made solely from meta-aramid polymer comprises poly (metaphenylene isophthalamide), which can be in the form of poly (metaphenylene isophthalamide) homopolymer.

One method of determining the predicted performance of a garment in a flame event is by use of an instrumented thermal manikin such as one known as the DuPont™ Thermo-Man® thermal manikin. Such devices have with a large number of sensors on the surface of the manikin that can record the temperature at multiple points on the surface of the manikin during a flame event. To test the flame performance of a garment, the garment-wearing thermal manikin is engulfed in flame for a set amount of time using a number of flame nozzles surrounding the manikin. The sensors record the temperature history at various points on the surface of the manikin and that data is used to calculate a total predicted body burn (burn injury). The test is conducted under the test method ASTM F1930 (2018). The NFPA Standard 2112 requires testing of a garment per ASTM F1930 (2018) at a flame exposure time of 3 seconds; however, ASTM F1930 can be conducted at longer flame exposure times, such as 4 or 5 seconds, reflecting more serious flame events, if desired.

In some embodiments, the flame-resistant garment comprises a fabric having the composition described herein and having a basis weight of 135 to 270 grams per square meter (4 to 8 ounces per square yard). Particularly when used in single-layer garments, fabric weights below about 135 gpm (4 osy) may not be robust enough to provide the desired protection in typical garments used by workers. Fabric weights in single-layer garments above about 270 gpm (8 osy) begin to be uncomfortable to wear. While higher basis weights, even as high as 410 gpm (12 osy) will provide flame protection, as the fabric weight increases, other issues such as stiffness and breathability and the potential for worker heat stress increase, making higher basis weights desirable only in the most dangerous of environments or in multilayer systems such as used in firefighter coats and pants.

In some embodiments, a 135 to 270 grams per square meter (4 to 8 ounces per square yard) fabric, having the composition described herein, provides a flame-resistant single-layer garment having a predicted total body burn performance, for a three-second exposure as measured by ASTM F1930 (2018), that is at least 20 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

In another embodiments, a 135 to 270 grams per square meter (4 to 8 ounces per square yard) fabric, having the composition described herein, provides a flame-resistant single-layer garment having a predicted total body burn performance, for a four-second exposure as measured by ASTM F1930 (2018), that is at least 15 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

In still other embodiments, this 135 to 270 grams per square meter (4 to 8 ounces per square yard) fabric, having the composition described herein, provides a flame-resistant single-layer garment having predicted total body burn performance, for a five-second exposure as measured by ASTM F1930 (2018), that is at least 10 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

FIG. 1 is a photo of the flame damage to two garments 10 and 15 after a four-second exposure to flames using a thermal manikin testing device (DuPont™ Thermo-Man® thermal manikin), the light areas of the garments being the flame-damaged areas. Garment 10 is an example of the flame damage to an inventive garment wherein the meta-aramid fiber component contains a fiber made from a polymer blend of meta-aramid polymer and polyvinylpyrrolidone (PVP) polymer as described herein. Pictured alongside 10 is a control garment 15 wherein the meta-aramid fiber component is only meta-aramid fiber and does not include a fiber made from a polymer blend of meta-aramid and polyvinylpyrrolidone (PVP). Prior to testing, both garments were of identical size. After testing, as shown, garment 10 has much less damage and had significantly less flame shrinkage than the control garment 15. Garment 15 has a larger proportion of light areas indicating large expanses of flame damage, and the flame shrinkage of the garment is much more severe than garment 10.

Figure 2:
FIG. 2 is a photo of inventive and control garments, respectively, showing the flame damage after a five-second exposure to flames using a thermal manikin testing device, the light areas of the garments being the flame-damaged areas.

Likewise, FIG. 2 is a photo of the flame damage to two garments 20 and 25 after a five-second exposure to flames also using a thermal manikin testing device (DuPont™ Thermo-Man® thermal manikin), the light areas of the garments again being the flame-damaged areas. Garment 20 is an example of the flame damage to an inventive garment wherein the meta-aramid fiber component contains a fiber made from a polymer blend of meta-aramid polymer and polyvinylpyrrolidone (PVP) polymer as described herein. Pictured alongside 20 is a control garment 25 wherein the meta-aramid fiber component is only meta-aramid fiber and does not include a fiber made from a polymer blend of meta-aramid and polyvinylpyrrolidone (PVP). Prior to testing, both garments were of identical size. After testing, as shown, garment 20 has much less damage and had significantly less flame shrinkage than the control garment 25. Garment 25 has a larger proportion of light areas indicating large expanses of flame damage, and the flame shrinkage of the garment is much more severe than garment 20. Also, both garments 20 and 25, which were exposed to a five-second flame event, show more damage than garments 10 and 15 of FIG. 1, which were exposed to a four-second flame event, illustrating even one second of exposure to flame can be significant.

Yarn used in the flame-resistant garment and fabric comprises a meta-aramid fiber component a) and a fiber made from para-aramid polymer b). The meta-aramid fiber component further comprises i) fiber containing a polymer blend of meta-aramid polymer and polyvinylpyrrolidone (PVP) polymer; and optionally comprises ii) fiber made solely from meta-aramid polymer, that is, meta-aramid fibers that do not contain the meta-aramid polymer/PVP polymer blend.

As used herein, "aramid" is meant a polyamide wherein at least 85% of the amide (—CONH—) linkages are attached directly to two aromatic rings. Meta-aramid polymers are aramid polymers where the amide linkages are in the meta-position relative to each other. Para-aramid polymers are aramid polymers where the amide linkages are in the para-position relative to each other. Non-polymeric additives can be used with the aramid and copolymers can be used having as much as 10 percent of other diamine substituted for the diamine of the aramid or as much as 10 percent of other diacid chloride substituted for the diacid chloride of the aramid. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 3,869,429; 3,819,587; 3,354,127; and 3,094,511.

The flame-resistant garment or flame-resistant fabric used in the flame-resistant garment comprises a yarn having a a) meta-aramid fiber component that optionally comprises ii) fiber made solely from meta-aramid polymer; that is, a fiber that comprises meta-aramid polymer but does not contain a blend of meta-aramid polymer/PVP polymer blend. One such meta-aramid polymer is poly (metaphenylene isophthalamide) (MPD-1), with homopolymer poly (metaphenylene isophthalamide) (MPD-1) being a preferred meta-aramid polymer. Useful meta-aramid containing fiber, including MPD-I containing fiber, has a Limiting Oxygen Index (LOI) of about 26 or higher. Various processes for making fiber made solely from meta-aramid polymer, including fibers that include MPD-I or consist of MPD-I homopolymer, include for example U.S. Pat. Nos. 3,063,966 and 5,667,743. Additional useful methods for making meta-aramid fibers like MPD-1-containing fibers include U.S. Pat. Nos. 7,771,636; 7,771,637; 7,771,638; 7,780,889; & 7,998,575. These patents disclose dry spinning of meta-aramid filaments using a spinning cell having a heated gaseous atmosphere, wherein heated gas is provided to the spin cell to remove solvent.

The flame-resistant garment or flame-resistant fabric used in the flame-resistant garment comprises a yarn comprising b) 3 to 15 weight percent of a fiber made from para-aramid polymer. In some embodiments, the yarn used in the flame-resistant garment and fabric comprises 3 to 7 weight percent of a fiber made from para-aramid polymer. One preferred fiber made from para-aramid polymer includes fiber comprising or consisting of poly (paraphenylene terephthalamide) (PPD-T) polymer. Useful PPD-T containing fiber has a Limiting Oxygen Index (LOI) of greater than 26. In some embodiments, the para-aramid polymer used to make the para-aramid fiber consists of poly (paraphenylene terephthalamide) (PPD-T) homopolymer. Various processes for making para-aramid fiber, including fibers that include PPD-T or consists of PPD-T homopolymer, include for example U.S. Pat. Nos. 3,414,645; 3,767,756; 3,869,429; & 3,869,430.

The flame-resistant garment or flame-resistant fabric used in the flame-resistant garment comprises a yarn having an a) meta-aramid fiber component that comprises i) fiber containing a polymer blend of meta-aramid polymer and polyvinylpyrrolidone (PVP) polymer. As used herein, polyvinylpyrrolidone polymer or PVP polymer is the polymer that results from the linear polymerization of monomer units of N-vinyl-2-pyrrolidone and can include small amounts of co-monomers that may be present in concentrations that do not interfere with the blending of the PVP polymer with the meta-aramid polymer. PVP polymer molecular weights range from as little as about 5000 to as much as about 1,000,000 grams per mole. PVP of very high molecular weight yields spinning dopes of high viscosity. In many embodiments, PVP polymer with a molecular weight of about 10,000 to about 360,000 is preferred. PVP polymer is not a flame-resistant polymer, as it will burn in air.

One method of making a fiber from a polymer blend of meta-aramid polymer and polyvinylpyrrolidone (PVP) polymer is to form a first isotropic polymer solution of the meta-aramid polymer in a first solvent and a second isotropic solution of PVP polymer in a second solvent and then combine those two isotropic polymer solutions to form a single polymer spinning solution having a blend of the two polymers. If desired, the polymer solutions can contain inorganic salts, and such salts can include chlorides or bromides having cations selected from the group consisting of calcium, lithium, magnesium or aluminum. Calcium chloride or lithium chloride salts are preferred. As used herein, the word "salt" is meant to include compounds that increase the solubility of the polymer in the selected solvent or help provide stable spinning solutions and excludes any additives (especially flame retardant additives) that might be salts but are only added to increase the limiting oxygen index of the polymer. The salt may be added as the chloride or bromide or produced from the neutralization of by-product acid from the polymerization of the aramid by adding to the polymerization solution oxides or hydroxides of calcium, lithium, magnesium or aluminum. The desired salt concentration may also be achieved by the addition of the halide to a neutralized solution to increase the salt content resulting from neutralization to the salt content desired for spinning.

The solvent is preferably selected from the group consisting of those solvents that also function as proton acceptors, for example dimethylforamide (DMF), dimethylacetamide (DMAc), N-methyl-2-pyrrolidone (NMP), and the like. Dimethyl acetamide (DMAc) is one preferred solvent. Preferably the solvent used in the each of the separate meta-aramid and PVP polymers solutions are the same solvent, and that solvent is preferably DMAc. Preferably each of the separate meta-aramid and PVP polymer solutions are isotropic solutions.

When the meta-aramid polymer solution is made from MPD-I and DMAc, preferably the polymer solution further includes at least 4 percent inorganic salt by weight for improved polymer solution stability. Generally, no additional stability additives are necessary for the polymer solution made from PVP and DMAc.

One preferred method of combining the two polymer solutions, wherein each polymer solution is made using the same solvent, is by centerline injection of the PVP polymer solution by a gear pump into a pipe carrying the meta-aramid polymer solution, followed by a static mixer, which mixes the two polymer solutions. This forms a fiber-spinnable isotropic polymer solution having a dispersed PVP polymer solution in a continuous meta-aramid polymer solution. The blend concentration of PVP polymer in the meta-aramid polymer in the final fiber can be controlled by using the gear pump to control the amount of PVP polymer solution added to the meta-aramid polymer solution.

Continuous filaments are then made by extruding the spinning solution through a spinneret having a plurality of spinneret holes to form dope filaments, followed by removal of solvent and other treatments such as washing, drying, and optionally heat treating as is known in the art.

One preferred method of extruding or spinning of filaments to obtain the desired fiber comprising the blend of meta-aramid and PVP polymer is by "dry-spinning" as in the dry spinning of meta-aramid or MPD-I filaments described previously herein. The process of "dry spinning" filaments is well known in the art and involves extruding a polymer solution through a spinneret and into a chamber known as a spin cell that has a heated gaseous atmosphere comprising an inert gas such as nitrogen. The spinneret holes form continuous streams of dope filaments, and as the dope filaments travel through the spin cell the heated gaseous atmosphere removes a substantial portion of the solvent from the dope filaments, leaving semi-solid filaments having enough physical integrity that they can be further processed. After the formation of semi-solid filaments, they can then be treated with additional liquids to cool the filaments and possibly extract additional solvent from them. Subsequent washing, drawing, and heat treatments can further extract solvent from the filaments in the yarn and develop any desired fiber properties. The filaments are then wound on bobbins as continuous filaments which preferably have solid centers without appreciable voids, that is, solid cross sections; these filaments can then be cut into staple fibers having solid cross sections if desired.

The flame-resistant garment or flame-resistant fabric used in the flame-resistant garment comprises a yarn comprising a) 85 to 97 weight percent of a meta-aramid fiber component. The meta-aramid fiber component can consist solely of a fiber made from a polymer blend of meta-aramid polymer and PVP polymer; or the meta-aramid fiber component is a blend of fibers comprising fiber made from a polymer blend of meta-aramid polymer and PVP polymer and fiber that contains meta-aramid polymer but does not contain the polymer blend of meta-aramid polymer and PVP polymer. In some embodiments, the flame-resistant garment or flame-resistant fabric used in the flame-resistant garment comprises a yarn comprising a) 93 to 97 weight percent of a meta-aramid fiber component and b) 3 to 7 weight percent of a fiber made from para-aramid polymer.

The meta-aramid fiber component comprises:
i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and
ii) 0 to 50 weight percent fiber made solely from meta-aramid polymer, based on the total amounts of i) and ii) in the meta-aramid fiber component.

In some other embodiments, i) of the meta-aramid fiber component comprises a fiber made from a polymer blend of 90 to 93 weight percent meta-aramid polymer and 7 to weight percent PVP polymer. It follows then, that in some embodiments, i) of the meta-aramid fiber component is 100 weight percent fiber made from 88 to 95 weight percent meta-aramid polymer and 5 to 12 weight percent PVP polymer; and that further, in some embodiments this 100 weight percent fiber is made from a polymer blend of 90 to 93 weight percent meta-aramid polymer and 7 to 10 weight percent PVP polymer.

In some other embodiments, ii) of the meta-aramid fiber component can further comprise modacrylic fiber, flame-retardant rayon fiber, lyocell fiber, or mixtures thereof, in addition to the fiber made solely from meta-aramid polymer.

For weight percent calculation purposes regarding ii) of the meta-aramid component, it is understood the amount of ii) of the meta-aramid fiber component is the total amount of fiber made solely from meta-aramid polymer plus the total amount(s) of any modacrylic fiber, flame-retardant rayon fiber, or lyocell fiber present in ii).

In some embodiments wherein ii) of the meta-aramid fiber component contains both the fiber made solely from meta-aramid polymer and one or more other fibers, the fiber made solely from meta-aramid polymer is a minority component in ii). That is, in those embodiments, less than 50 weight percent of ii) is fiber made solely from meta-aramid polymer, which means that less than 25 weight percent of the total amount of i) and ii) in the meta-aramid component is fiber made solely from meta-aramid polymer.

In some embodiments, wherein ii) of the meta-aramid fiber component contains both the fiber made solely from meta-aramid polymer and modacrylic fiber, at least 60 weight percent of ii) is modacrylic fiber. It follows that in this embodiment, ii) comprises 1 to 40 weight percent fiber made solely from meta-aramid polymer and 60 to 99 weight percent modacrylic fiber. In one preferred embodiment, ii) comprises 20 to 40 weight percent fiber made solely from meta-aramid polymer and 60 to 80 weight percent modacrylic fiber.

In still other embodiments, wherein ii) of the meta-aramid fiber component contains both the fiber made solely from meta-aramid polymer and either flame-retardant (FR) rayon fiber or lyocell fiber, or mixtures of retardant rayon fiber and lyocell fiber, at least 40 weight percent of ii) is FR rayon fiber, lyocell fiber, or mixtures thereof. It follows that in this embodiment, ii) comprises 1 to 60 weight percent fiber made solely from meta-aramid polymer and 40 to 99 weight percent FR rayon fiber, lyocell fiber, or mixtures thereof. In one preferred embodiment, ii) comprises 20 to 60 weight percent fiber made solely from meta-aramid polymer and 40 to 80 weight percent FR rayon fiber, lyocell fiber, or mixtures thereof.

Therefore, it is understood that there are embodiments wherein the meta-aramid fiber component comprises i) and ii), and the i) fiber is present in an amount of at least 50 weight percent up to less than 100 weight percent, combined with the ii) fiber being present in an amount that is greater than 0 weight percent to 50 weight percent. Further, the fiber of ii) can be made from one or more meta-aramid polymer(s), but it is understood that none of these meta-aramid polymer(s) contain(s) any PVP polymer; they are free of PVP polymer. Preferably ii) is fiber made from a single meta-aramid polymer, and that preferred single meta-aramid polymer is poly(metaphenylene isophthalamide), preferably poly(metaphenylene isophthalamide) homopolymer.

In still other embodiments, the flame-resistant garment or flame-resistant fabric used in the flame-resistant garment comprises a yarn comprising:
a) 85 to 97 weight percent of a meta-aramid fiber component, and
b) 3 to 15 weight percent of a fiber made from para-aramid polymer, and
c) 1 to 3 weight percent of an antistat fiber, based on the total amounts of a), b), and c) in the yarn.

Additionally, it is intended that all the possible features and descriptions relating to the various embodiments comprising a) and b) that were previously provided herein equally apply to the embodiment comprising a), b), and c), and are not repeated here to reduce redundancy.

One suitable antistat fiber is a melt-spun thermoplastic antistatic fiber such as the carbon-core nylon fibers described in U.S. Pat. No. 4,612,150 to De Howitt and/or U.S. Pat. No. 3,803,453 to Hull.

In some preferred embodiments, the flame-resistant fabric used in the flame-resistant garment is a colored, dyed, or mock-dyed fabric. If desired, the level of crystallinity of meta-aramid fibers can be increased by a chemical treatment, and in some embodiments, these chemical treatments include methods that color, dye, or mock dye the fibers prior to being incorporated into a fabric. Some such chemical treatment methods are disclosed in, for example, U.S. Pat. Nos. 4,668,234; 4,755,335; 4,883,496; and 5,096,459. A dye assist agent, also known as a dye carrier, may be used to help increase dye pick up of the aramid fibers. Useful dye carriers include aryl ether, benzyl alcohol, or acetophenone. As used herein, the term "mock dye" means treating the fabric with a liquid chemical, typically a dye assist agent or dye carrier as described previously but without any dye or additional coloration; the mock dyeing treatment being not for the purposes of dyeing or coloring the fabric, but to simply stabilize the fabric by crystallization of the fibers in the yarns.

By flame-resistant garment, it is meant any type of article or apparel designed to be worn on the body for protection from flames or fire. Some such garments are known as turnout coats and turnout gear, which are useful for firefighters; while other garments are used in industrial applications where workers may be exposed to environments where fire and flame protection is needed. In a preferred embodiment, flame-resistant garments are made from flame-resistant fabrics. As used herein, a fabric is considered flame-resistant if the fabric has a char length equal to or less than 4 inches (100 mm) and an afterflame equal to or less than 2 seconds per the vertical flame test of ASTM D6413-15.

Flame-resistant garments can include coats, jackets, jumpsuits, coveralls, pants, sleeves, hoods, aprons, gloves, and other types of apparel where protection against fire and flame is needed. In some applications such as coveralls, the garment can have essentially one layer of the flame-resistant fabric described herein. In other applications, the garment can have multiple layers, such as a firefighter's turnout coat, with one or more of the coat layers comprising the flame-resistant fabric described herein.

Flame-resistant garments can be made from flame-resistant fabrics using appropriate methods for making the desired type of garment. For example, for single-layer coveralls, a layer of the flame-resistant fabric is cut using a preferred pattern as a guide to generate pieces to form the various parts of the garment. The pieces are then connected together, typically by sewing, to form the actual garment. Generally, in commercial production, many layers of the fabric are laid up on a cutting table and then cut at one time to form multiple pieces for multiple garments, which are then individually assembled and sewn to make multiple garments. More complex garments, such as firefighter turnout coats, require layers of multiple protective material but are made in much the same manner. In such multiple layer garments, the flame-resistant fabrics described herein have particular application as either in the inner liner or the exterior shell.

By "fabric", it is meant any woven or knitted layer structure made from yarns. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments. By "knitted" is meant a structure producible by interlocking a series of loops of one or more yarns by means of needles or wires, such as warp knits (e.g., tricot, Milanese, or raschel) and weft knits (e.g., circular, or flat). In many instances, to make a knitted fabric, spun staple yarn is fed to a knitting machine that converts the yarn to fabric. If desired, multiple ends or yarns can be supplied to the knitting machine either as plied or single yarns; that is, a bundle of yarns or a bundle of plied yarns can be co-fed to the knitting machine and knitted into a fabric, or into an article of apparel comprising a fabric such as a glove, using conventional techniques. The tightness of the knit can be adjusted to meet any specific need. Single jersey knits and terry knits can provide a very effective combination of properties for protective apparel.

By "yarn", it is meant an assemblage of fibers spun or twisted together to form a continuous strand. As used herein, a yarn generally refers to what is known in the art as a singles yarn, which is the simplest strand of textile material suitable for such operations as weaving and knitting, or a ply yarn or plied yarn. A spun staple yarn can be formed from staple fibers with more or less twist. When twist is present in a singles yarn, it is all in the same direction. As used herein the phrases "ply yarn" and "plied yarn" can be used interchangeably and refer to two or more yarns, i.e., singles yarns, twisted or plied together. Typically, when two singles yarns are twisted together to form a ply yarn, the twist direction in the ply yarn is opposite the twist direction in the singles yarns.

For purposes herein, the term "fiber" is defined as a relatively flexible, macroscopically homogeneous body having a high ratio of length to the width of the cross-sectional area perpendicular to that length. The fiber cross section can be any shape, depending on the polymer and its processing, but is typically round or bean-shaped. Also, such fibers preferably have a generally solid cross section for adequate strength in textile uses; that is, the fibers preferably are not appreciably voided or do not have a large quantity of objectionable voids. Fibers obtained directly from a filament spinning process and typically collected onto a bobbin in a package are referred to as continuous fibers or filaments. Such continuous fibers or filaments can be converted into short lengths called staple fiber, which refers to fibers that are cut to a desired length or are stretch broken. Staple fibers have a lower ratio of length to the width of the cross-sectional area perpendicular to that length, when compared with continuous filaments. Man-made staple fibers are cut or made to a length suitable for processing on, for example, cotton, woolen, or worsted yarn spinning equipment. Staple fibers can have (a) substantially uniform length, (b) variable or random length, or (c) a substantially uniform distribution of lengths.

In some embodiments, the fibers have a linear density of 1 to 3 dtex (0.9 to 2.7 denier), which is a fiber size that is especially useful in the manufacture of woven and knit textiles. This linear density range essentially provides fibers that have a minimum cross-sectional diameter, measured at any point on the fiber, that is greater than about 5 microns.

As used herein, a fiber is considered flame-resistant if a fabric made solely from that fiber has a char length equal to or less than 4 inches (100 mm) and an afterflame equal to or less than 2 seconds per the vertical flame test of ASTM D6413-15. Additionally, as used herein, a polymer or fiber made from the polymer is considered to be fire-resistant if the polymer has a limiting oxygen index greater than 21.

If a blend of different staple fibers is used in a yarn, it is preferred that blend be an intimate blend of staple fibers. The intimate blend can be made by cutter blending strands or tows of different fibers or by blending different bales of fibers and other means known in the art of forming an intimate blend. For example, the two or more slivers of different staple fiber types can be blended prior to or while a staple fiber yarn is being spun so that the various staple fibers are distributed homogeneously as an intimate blend in the staple yarn bundle.

In some embodiments, suitable staple fibers have a cut length of from 1 to 30 centimeters (0.39 to 12 inches). In some embodiments, suitable staple fibers have a length of 2.5 to 20 cm (1 to 8 in). In some preferred embodiments the staple fibers made by short staple processes have a cut length of 6 cm (2.4 in) or less. In some preferred embodiments the staple fibers made by short staple processes have a staple fiber length of 1.9 to 5.7 cm (0.75 to 2.25 in) with the fiber lengths of 3.8 to 5.1 cm (1.5 to 2.0 in) being especially preferred. For long staple, worsted, or woolen system spinning, fibers having a length of up to 16.5 cm (6.5 in) are preferred.

The staple fibers can be made by any process. For example, the staple fibers can be cut from continuous straight fibers using a rotary cutter or a guillotine cutter resulting in straight (i.e., non-crimped) staple fiber, or additionally cut from crimped continuous fibers having a saw tooth shaped crimp along the length of the staple fiber, with a crimp (or repeating bend) frequency of preferably no more than 8 crimps per centimeter. Preferably the staple fibers have crimp.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Spun staple yarn can be made from staple fibers using traditional long and short staple ring spinning processes that are well known in the art. However, it is not intended that yarn manufacture be limited to ring spinning because the yarns may also be spun using air jet spinning, open end spinning, and many other types of spinning that converts staple fiber into useable yarns. Spun staple yarns can also be made directly by stretch breaking using stretch-broken tow-to-top staple processes. The staple fibers in the yarns formed by traditional stretch break processes typically have length of up to 18 cm (7 in) long; however, spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

This invention further relates to a flame-resistant fabric comprising a yarn, the yarn comprising a) 85 to 97 weight percent of a meta-aramid fiber component and b) 3 to 15 weight percent of a fiber made from para-aramid polymer, based on the total amount of a) and b) in the yarn. In some embodiments, the flame-resistant fabric comprises a yarn comprising a) 93 to 97 weight percent of a meta-aramid fiber component and b) 3 to 7 weight percent of a fiber made from para-aramid polymer. The preferred para-aramid polymer used in b) fiber in the flame-resistant fabric is made from poly (paraphenylene terephthalamide). The meta-aramid fiber component comprises i) 50 to 100 weight percent fiber made from a polymer blend of meta-aramid polymer and polyvinylpyrrolidone (PVP) polymer, and ii) 0 to 50 weight percent fiber made solely from meta-aramid polymer, based on the total amount of i) fiber and ii) fiber in the meta-aramid fiber component. Specifically, i) of the meta-aramid fiber component comprises fiber are made from a polymer blend comprising 88 to 95 weight percent meta-aramid polymer and 5 to 12 weight percent PVP polymer. In some preferred embodiments, i) of the meta-aramid fiber component comprises fiber made from a polymer blend comprising 90 to 93 weight percent meta-aramid polymer and 7 to 10 weight percent PVP polymer.

In some embodiments, ii) of the meta-aramid fiber component consists of fiber made solely from meta-aramid polymer. In some embodiments, ii) of the meta-aramid fiber component comprises at least two types of fiber, one of which is fiber made solely from meta-aramid polymer. In some embodiments, the meta-aramid fiber component ii) can further comprise modacrylic fiber, flame-retardant rayon fiber, lyocell fiber, or mixtures thereof. For weight percent calculation purposes regarding ii) of the meta-aramid component, it is understood the amount of ii) of the meta-aramid fiber component is the total amount of fiber made solely from meta-aramid polymer plus the total amount(s) of any modacrylic fiber, flame-retardant rayon fiber, or lyocell fiber present in ii).

In some of the embodiments, the yarn used in the fabric further comprises c) 1 to 3 weight percent of an antistat fiber, based on the total amount of a), b), and c) in the yarn.

In the meta-aramid fiber component i) that contains a fiber made from a polymer blend of meta-aramid polymer and PVP, the preferred meta-aramid polymer blended with the PVP in those fibers is poly (metaphenylene isophthalamide). In the meta-aramid fiber component ii) that contains fiber made solely meta-aramid polymer, the preferred meta-aramid polymer is poly (metaphenylene isophthalamide) and includes poly (metaphenylene isophthalamide) homopolymer. In some embodiments, the flame-resistant fabric is dyed or mock-dyed to increase the crystallinity of the meta-aramid fiber component as described previously.

It is understood that the flame-resistant fabric is useful in the flame-resistant garments described previously herein, and it is intended that all the possible features and descriptions relating to the various embodiments of garments, fabrics, or yarns used in the description of the flame-resistant garment that were previously provided herein equally apply to the flame-resistant fabric here (and vice versa) and are not repeated here to reduce redundancy.

In some embodiments, the flame-resistant fabric has a flame shrinkage that is at least 10 percent less than the flame shrinkage of a control fabric of equal weight containing, in the same proportions, the meta aramid fiber component a) and the para-aramid fiber b) (i.e., a) and b)), but wherein the meta-aramid fiber component of the control fabric is fiber made solely from meta-aramid polymer and does not include a fiber made from a polymer blend of meta-aramid and polyvinylpyrrolidone (PVP). In some other embodiments, the flame-resistant fabric has a flame shrinkage that is at least 20 percent less than the flame shrinkage of a control fabric of equal weight containing, in the same proportions, the meta aramid fiber component a) and the para-aramid fiber b) (i.e., a) and b)), but wherein the meta-aramid fiber component of the control fabric is fiber made solely from meta-aramid polymer and does not include a fiber made from a polymer blend of meta-aramid and polyvinylpyrrolidone (PVP).

Test Methods Fabric flame shrinkage performance was measured using a modified test based on NFPA 2112-2018, using the method for determining heat transfer performance (HTP). The test procedure and equipment is as stated in the NFPA 2112 HTP test, which requires an exposure of 2.00 cal/cm$^2$·sec. and the copper disk in the sensor holder is completely visible through the 2-inch square hole in the specimen plate. Cut samples of the fabric to be tested were 2 inches wide by 10 inches long. Three samples were cut in the warp direction and three samples were cut in the fill direction for reproducibility. Each sample length was measured to the nearest tenth of an inch prior to testing. Each sample was then taped flat onto the specimen test plate so that the entire hole is covered. The specimen test plate was then placed onto the test stand, followed by placing a 10 gram weight on the sample about ½ inch from the bottom to hold it onto the specimen test plate. The flame exposure time was then entered (at this case, sample was exposed to 3, 4, and 5 seconds) and the specimen test plate mounted onto the test apparatus. The sample is then exposed to the flame, and when the test is complete, the exposed sample is removed from the test plate and again measured to the nearest tenth of an inch. The percent flame shrinkage is calculated by using the following formula:

$$\frac{(\text{Original length} - \text{Exposed length}) \times 100}{\text{Original length}}$$

Predicted Total Body Burn Performance of the garments was determined per ASTM F1930 (2018), using a DuPont™ Thermo-Man® thermal manikin.

Example 1

An intimate blend of staple fibers in the form of a picker blend sliver of 95 weight percent PVP-containing meta-aramid fiber and 5 weight percent para-aramid fiber was prepared, wherein the meta-aramid fiber is made from a polymer blend of 90 weight percent MPD-I homopolymer and 10 weight percent PVP polymer. The para-aramid fiber was made from PPD-T homopolymer. The intimate blend was then made into spun staple yarn using cotton system processing and an air-jet spinning frame. The resultant yarn was a 18.4 tex (32 cotton count) singles yarn. Two singles yarns were then plied on a plying machine to make a two-ply yarn having a ply twist of 10 turns/inch.

The yarn was then used in the warp and fill of a fabric that was woven on a shuttle loom in a warp-faced 2×1 twill construction. The greige twill fabric had a construction of approximately 31 ends×18 picks per cm (77 ends×52 picks per inch) and a basis weight of 186 g/m$^2$ (5.5 oz/yd$^2$). The fabric was then dyed to yield a fabric having a basis weight of approximately 237 g/m$^2$ (7 oz/yd$^2$).

Comparison Example A

As a control, an intimate blend of staple fibers in the form of a picker blend sliver was prepared as in Example 1; however, the blend contained 95 weight percent meta-aramid fiber that did not contain any PVP polymer but contained only MPD-I homopolymer. The 5 weight percent para-aramid fiber was again made from PPD-T homopolymer. Example 1 was then repeated using this blend, making spun staple yarn, ply yarn, and a warp-faced 2×1 twill construction woven fabric of the same construction having a basis weight of 186 g/m$^2$ (5.5 oz/yd$^2$). As in Example 1, the fabric was then dyed to yield a fabric having a basis weight of approximately 237 g/m$^2$ (7 oz/yd$^2$).

Example 2

The woven fabrics of Example 1 and Comparison Example A were then used to make coveralls for flame testing on a thermal manikin. The coveralls were made using the garment sizing and details provided in ASTM F1930-00 for thermal manikin testing, and then the garments were individually tested on a DuPont™ Thermo-Man® thermal manikin per ASTM F1930-00 to measure their performance in a flash fire. Two garments were made from the Example 1 fabric and two garments were made from the Comparison Example A fabric.

FIG. 1 is a photo of an Inventive garment 10 made from the Example 1 fabric pictured side-by-side with a Control garment 15 made from the Comparison Example A fabric, respectively, showing the flame damage after a four-second exposure to flames using the thermal manikin testing device. The light areas of the garments in the photo are the flame-damaged areas. FIG. 2 is a photo of an Inventive garment 20 made from the Example 1 fabric pictured side-by-side with a Control garment 25 made from the Comparison Example A fabric, respectively, showing the flame damage after a five-second exposure to flames using the thermal manikin testing device. Again, the light areas of the garments in the photo are the flame-damaged areas. As shown in FIGS. 1 & 2, the coveralls made with the Example 1 fabric (10, 20) have less visible shrinkage than the coveralls made with the Comparison Example A fabric (15, 25). The DuPont™ Thermo-Man® thermal manikin Predicted Percentage of Total Body Burn for these garments is shown in Table 1.

TABLE 1

| Fabric | Flame Exposure Time (sec) | Predicted Total Body Burn (%) | Reduction In Predicted Total Body Burn (%) |
|---|---|---|---|
| Example 1 | 4 | 6 | 60 |
| Comparison A | 4 | 15 | — |
| Example 1 | 5 | 31 | 18 |
| Comparison A | 5 | 38 | — |

The inventive garment using the fabric of Example 1 provided a remarkable reduction in percent body burn in a flash fire. This is especially surprising given that in the inventive garment, 10 percent of the flame resistant and more thermally staple meta-aramid polymer in the meta-aramid fiber used in that fabric was replaced with polyvinylpyrrolidone (PVP) polymer, which is a non-flame resistant polymer (i.e., is not a flame resistant polymer).

Example 3 and Comparison Example B

Example 1 was repeated, again using an intimate blend of staple fibers in the form of a picker blend sliver of 95 weight percent PVP-containing meta-aramid fiber (specifically MPD-I/PVP fiber) and 5 weight percent para-aramid fiber (specifically PPD-T fiber); however, the resultant two-ply spun staple yarn was a 16.3 tex (36 cotton count) yarn, meaning the greige twill woven fabric had a basis weight of 159 g/m² (4.7 oz/yd²). The fabric was then dyed to make a dyed fabric having a basis weight of 169.5 g/m² (5 oz/yd²).

Likewise, Comparison Example A was repeated to make a control fabric, again using an intimate blend of staple fibers in the form of a picker blend sliver of 95 weight percent meta-aramid fiber that did not contain any PVP (specifically only MPD-I fiber) and 5 weight percent para-aramid fiber (specifically PPD-T fiber); however, the resultant two-ply spun staple yarn was a 16.3 tex (36 cotton count) yarn, and the greige twill woven fabric had a basis weight of 159 g/m² (4.7 oz/yd²). The fabric was then dyed to make a dyed fabric having a basis weight of 169.5 g/m² (5 oz/yd²).

Samples of both the Inventive (Example 3) fabric and the Control (Comparison Example B) fabric were then tested for flame shrinkage after an exposure to flame of four seconds, using the modified test method disclosed herein that is based on the NFPA 2112 HTP test. The resulting properties of the fabrics is shown in Table 2.

TABLE 2

| Fabric | Warp Flame Shrinkage (%) | Fill Flame Shrinkage (%) | Percent Difference Warp (%) | Percent Difference Fill (%) |
|---|---|---|---|---|
| Example 3 | 7 | 6 | 22 | 14 |
| Comparison B | 9 | 7 | — | — |

As shown in Table 2, the Inventive fabric had reduced flame shrinkage (shrink less in flame) in both the warp and fill directions over the Control.

Example 4

Figure 3:
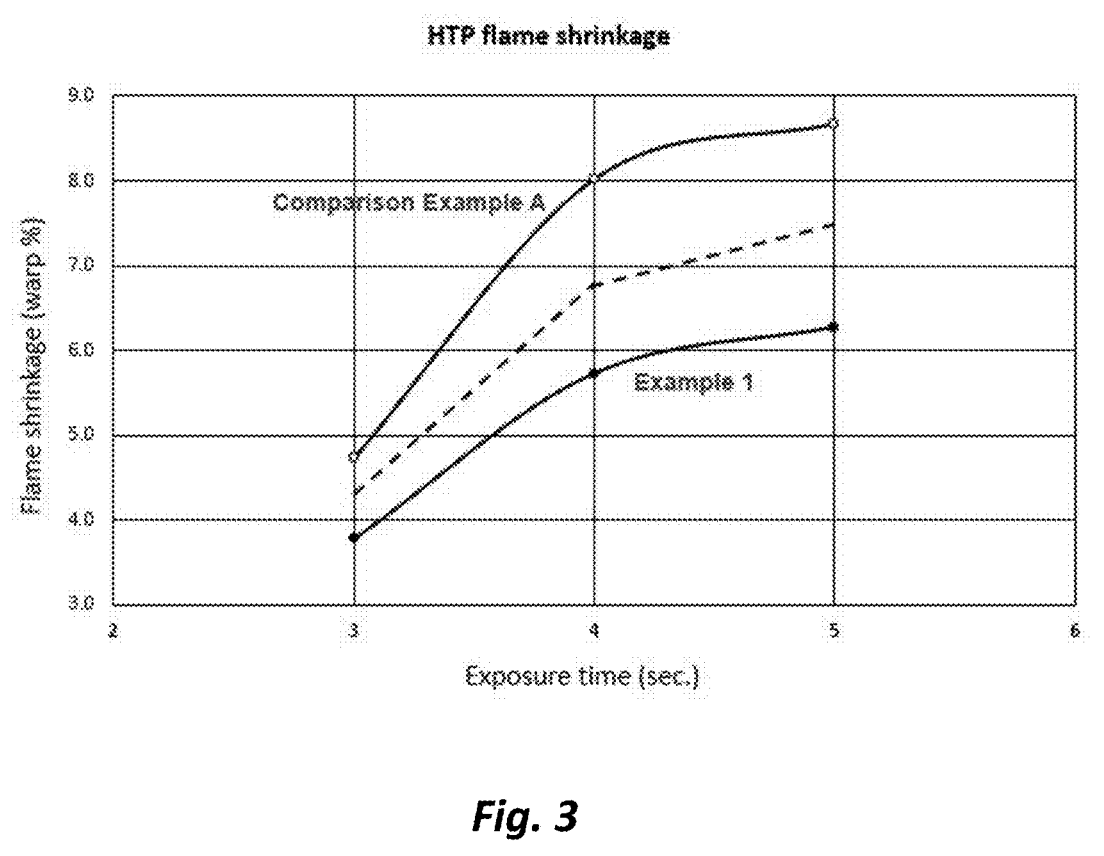

Samples of both the dyed Inventive (Example 1) fabric and the dyed (Comparison Example A) fabric were then further tested for their flame shrinkage, again using the modified test method disclosed herein that is based on the NFPA 2112 HTP test; however, the flame exposure time was varied. FIG. 3 is a graph of the measured flame shrinkage percentage of the fabrics for a flame exposure of 3, 4, and 5 seconds exposure. Also included in the FIG. 3 graph is dotted line representing the expected performance of woven fabrics made from the same overall proportions of meta-aramid and para-aramid fibers used in Example 1 and Comparison Example A, but wherein the intimate blend contains, as its meta-aramid component, 50 weight percent fiber made only with MPD-I polymer and 50 weight percent fiber made from the polymer blend of 90 weight percent MPD-I polymer and weight percent PVP polymer. The fabrics containing the fibers made with the meta-aramid/PVP polymer blend have lower flame shrinkage than the fabrics containing the fibers that do not have the meta-aramid/PVP polymer.

Example 5

Example 1 was repeated; however, the intimate blend of staple fibers in the form of a picker blend sliver contained 93 weight percent PVP-containing meta-aramid fiber (specifically the MPD-I/PVP fiber), 5 weight percent para-aramid fiber (specifically the PPD-T fiber), and the intimate blend further contained 2 weight percent of a carbon-core nylon antistatic fiber. The resultant spun staple yarn was a 21 tex (36 cotton count) single yarn. Two single yarns were then plied on a plying machine to make a two-ply yarn having a ply twist of 10 turns/inch.

The yarn was then used as in the warp and fill of a fabric that was woven on a shuttle loom in plain weave construction. The greige fabric had a construction of approximately 28 ends×15 picks per cm (7769 ends×52 44 picks per inch) and a basis weight of 142 g/m² (4.2 oz/yd²). The fabric was then dyed to yield a fabric having a basis weight of approximately 163 g/m² (4.8 oz/yd²).

Comparison Example C

Example 5 was repeated to make a control fabric; however, the intimate blend consisted of 93 weight percent meta-aramid fiber that contained only MPD-1 polymer and did not contain any PVP polymer, 5 weight percent para-aramid fiber (specifically PPD-T fiber), and 2 weight percent carbon-core nylon antistatic fiber. As in Example 5, spun staple yarn and ply yarn were made, and a plain weave woven fabric of the same construction as in Example 5 and having a basis weight of 142 g/m² (4.2 oz/yd²) was made. As in Example 5, the fabric was then dyed to yield a fabric having a basis weight of approximately 149 g/m² (4.4 oz/yd²).

Example 6

The woven fabrics of Example 5 and Comparison Example C were then used to make coveralls for flame testing on a thermal manikin. The coveralls were made using the garment sizing and details provided in ASTM F1930-00 for thermal manikin testing, and then the garments were individually tested on a DuPont™ Thermo-Man® thermal manikin per ASTM F1930-00 for their performance in a flash fire. Three garments were made from the Example 5 fabric and three garments were made from the Comparison Example C fabric. The data was then averaged and normalized to a nominal 153 g/m² (4.5 oz/yd²) and the Predicted Percentage of Total Body Burn for these garments is shown in Table 3.

TABLE 3

| Fabric | Fabric Basis Weight | Flame Exposure Time (sec) | Predicted Total Body Burn (%) | Reduction In Predicted Total Body Burn* (%) |
|---|---|---|---|---|
| Example 5 | 4.8 | 3 | 29 | 24 |
| Comparison C | 4.4 | 3 | 38 | — |

*Normalized to a nominal 153 g/m² (4.5 oz/yd²)

The inventive garments using the fabric of Example 5, despite their very low basis weight, still provided a remarkable reduction in percent total body burn in a flash fire, when compared to the control. This is especially surprising given that in the inventive garment 10 percent of the flame resistant and more thermally stable meta-aramid polymer in the meta-aramid fiber used in that fabric was replaced with polyvinylpyrrolidone (PVP) polymer, which is a non-flame resistant polymer (i.e., is not a flame resistant polymer).

The invention claimed is:
1. A flame-resistant garment comprising a flame-resistant fabric comprising a yarn, the yarn comprising:
 a) 85 to 97 weight percent of a meta-aramid fiber component, and b) 3 to 15 weight percent of a fiber made from para-aramid polymer, based on the total amount of a) and b) in the yarn;

wherein the meta-aramid fiber component is:

i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and ii) 0 to 50 weight percent fiber made solely from meta-aramid polymer, based on the total amount of i) and ii) in the meta-aramid fiber component.

2. The flame-resistant garment of claim 1 wherein the yarn comprises a) 93 to 97 weight percent of a meta-aramid fiber component, and b) 3 to 7 weight percent of a fiber made from para-aramid polymer.

3. The flame-resistant garment of claim 1 wherein the meta-aramid fiber component ii) further comprises modacrylic fiber, flame-retardant rayon fiber, lyocell fiber, or mixtures thereof.

4. The flame-resistant garment of claim 1, wherein the yarn further comprises:

c) 1 to 3 weight percent of an antistat fiber, based on the total amount of a), b), and c) in the yarn.

5. The flame-resistant garment of claim 1, wherein the polymer blend of meta-aramid polymer and PVP polymer comprises 90 to 93 weight percent meta-aramid polymer and 7 to 10 weight percent PVP polymer.

6. The flame-resistant garment of claim 1 wherein the meta-aramid polymer is poly (metaphenylene isophthalamide).

7. The flame-resistant garment of claim 1 wherein the para-aramid polymer is poly (paraphenylene terephthalamide).

8. The flame-resistant garment of claim 1 wherein the fabric in the garment is a colored, dyed, or mock-dyed fabric.

9. The flame-resistant garment of claim 1 wherein the fabric has a basis weight of 135 to 270 grams per square meter (4 to 8 ounces per square yard).

10. The flame-resistant garment of claim 9 wherein the garment has a predicted total body burn performance, for a three-second exposure as measured by ASTM F1930 (2018), that is at least 20 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

11. The flame-resistant garment of claim 9 wherein the garment has a predicted total body burn performance, for a four-second exposure as measured by ASTM F1930 (2018), that is at least 15 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

12. The flame-resistant garment of claim 9 wherein the garment has a predicted total body burn performance, for a five-second exposure as measured by ASTM F1930 (2018), that is at least 10 percent less than a garment made from a control fabric of equal weight containing, in the same proportions, the meta-aramid fiber component and a para-aramid fiber described in a) and b), but wherein the meta-aramid fiber component of the control fabric is fiber made solely from meta-aramid polymer and does not include a fiber made from a polymer blend of meta-aramid and polyvinylpyrrolidone (PVP).

13. A flame-resistant fabric comprising a yarn, the yarn comprising:

a) 85 to 97 weight percent of a meta-aramid fiber component, and b) 3 to 15 weight percent of a fiber made from para-aramid polymer, based on the total amount of a) and b) in the yarn;

wherein the meta-aramid fiber component is i) 50 to 100 weight percent fiber made from a polymer blend of meta-aramid polymer and polyvinylpyrrolidone (PVP) polymer, the polymer blend comprising 88 to 95 weight percent meta-aramid polymer and 5 to 12 weight percent PVP polymer, and ii) 0 to 50 weight percent fiber made solely from meta-aramid polymer, based on the total amount of i) and ii) in the meta-aramid fiber component.

14. The flame-resistant fabric of claim 13 wherein the yarn comprises a) 93 to 97 weight percent of a meta-aramid fiber component, and b) 3 to 7 weight percent of a fiber made from para-aramid polymer.

15. The flame-resistant fabric of claim 13, wherein the meta-aramid fiber component ii) further comprises modacrylic fiber, flame-retardant rayon fiber, lyocell fiber, or mixtures thereof.

16. The flame-resistant fabric of claim 13, wherein the yarn further comprises:

c) 1 to 3 weight percent of an antistat fiber, based on the total amount of a), b), and c) in the yarn.

17. The flame-resistant fabric of claim 13 wherein the polymer blend of meta-aramid polymer and PVP polymer comprises 90 to 93 weight percent meta-aramid polymer and 7 to 10 weight percent PVP polymer.

18. The flame-resistant fabric of claim 13 wherein the meta-aramid polymer is poly (metaphenylene isophthalamide).

19. The flame-resistant fabric of claim 13 wherein the para-aramid polymer is poly (paraphenylene terephthalamide).

20. The flame-resistant fabric of claim 13 wherein the fabric is dyed or mock-dyed.

21. The flame-resistant fabric of claim 13 wherein the fabric has a basis weight of 135 to 270 grams per square meter (4 to 8 ounces per square yard).

22. The flame-resistant fabric of claim 13 having a flame shrinkage that is at least 10 percent less than the flame shrinkage of a control fabric of equal weight containing, in the same proportions, the meta-aramid fiber component and the para-aramid fiber described in a) and b), but wherein the meta-aramid fiber component of the control fabric is fiber made solely from meta-aramid polymer and does not include the fiber made from a polymer blend of meta-aramid and polyvinylpyrrolidone (PVP).

23. The flame-resistant fabric of claim 13 having a flame shrinkage that is at least 20 percent less than the flame shrinkage of a control fabric of equal weight containing, in the same proportions, the meta-aramid fiber component and the para-aramid fiber described in a) and b), but wherein the meta-aramid fiber component of the control fabric is fiber made solely from meta-aramid polymer and does not include the fiber made from a polymer blend of meta-aramid and polyvinylpyrrolidone (PVP).

\* \* \* \* \*